(12) United States Patent
Ferris et al.

(10) Patent No.: US 11,949,709 B2
(45) Date of Patent: *Apr. 2, 2024

(54) MONITORING CLOUD COMPUTING ENVIRONMENTS

(71) Applicant: Red Hat, Inc., Raleigh, NC (US)

(72) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/142,013

(22) Filed: Jan. 5, 2021

(65) Prior Publication Data
US 2021/0126924 A1 Apr. 29, 2021

Related U.S. Application Data

(63) Continuation of application No. 15/386,103, filed on Dec. 21, 2016, now Pat. No. 10,924,506, which is a
(Continued)

(51) Int. Cl.
*H04L 41/22* (2022.01)
*G06F 3/0481* (2022.01)
(Continued)

(52) U.S. Cl.
CPC .......... *H04L 63/145* (2013.01); *G06F 3/0481* (2013.01); *G06F 3/067* (2013.01);
(Continued)

(58) Field of Classification Search
CPC .......... G06F 21/00; G06F 15/16; G06F 12/16; G06F 9/44; G06F 2201/815;
(Continued)

(56) References Cited

U.S. PATENT DOCUMENTS

| 6,463,457 B1 | 10/2002 | Armentrout et al. |
| 6,567,107 B1 | 5/2003 | Stannard |

(Continued)

FOREIGN PATENT DOCUMENTS

| CN | 101964707 | | 2/2011 | |
| CN | 101971162 A | * | 2/2011 | ......... G06F 9/45533 |

(Continued)

OTHER PUBLICATIONS

Virtualization vs. Cloud Computing, Business News Daily, Jan. 2014, 7 pages.

(Continued)

*Primary Examiner* — Steven P Sax
(74) *Attorney, Agent, or Firm* — Womble Bond Dickinson (US) LLP (57) ABSTRACT

An example method of monitoring computing resources in a cloud computing environment may include receiving a request to subscribe to a monitoring service with respect to computing resources associated with a user account, the request specifying access information for a cloud computing system comprising a plurality of virtual machines associated with the computing resources. The method may further include monitoring, using the access information, the plurality of virtual machines. The method may further include identifying, in view of the monitoring, a virus-infected application running on a virtual machine of the plurality of virtual machines. The method may further include terminating the virus-infected application. The method may further include receiving, in view of the monitoring, resource usage data reflecting types and duration of usage of the computing resources. The method may further include generating, in view of the usage data, a report reflecting usage of the computing resources.

20 Claims, 6 Drawing Sheets

Related U.S. Application Data continuation of application No. 12/627,764, filed on Nov. 30, 2009, now Pat. No. 9,529,689.

(51) Int. Cl.

| | |
|---|---|
| *G06F 3/06* | (2006.01) |
| *G06F 9/451* | (2018.01) |
| *G06F 9/455* | (2018.01) |
| *G06F 11/34* | (2006.01) |
| *G06F 16/954* | (2019.01) |
| *H04L 9/40* | (2022.01) |
| *H04L 43/0882* | (2022.01) |

(52) U.S. Cl.
CPC .......... *G06F 9/452* (2018.02); *G06F 9/45558* (2013.01); *G06F 11/3466* (2013.01); *G06F 16/954* (2019.01); *H04L 41/22* (2013.01); *H04L 43/0882* (2013.01); *H04L 63/083* (2013.01); *G06F 2009/45591* (2013.01); *G06F 2009/45595* (2013.01); *G06F 11/3409* (2013.01); *G06F 2201/815* (2013.01); *G06F 2201/865* (2013.01); *G06F 2201/875* (2013.01)

(58) Field of Classification Search
CPC ......... G06F 2201/865; G06F 2201/875; G06F 3/067; G06F 3/04812; G06F 11/3409; G06F 3/0482; G06F 3/0484; G06F 3/0488; G06F 9/452; G06F 3/0481; G06F 16/954; G06F 11/3466; G06F 9/45558; G06F 2009/45591; G06F 2009/45595; H04L 9/00; H04L 29/06; H04L 63/83; H04L 63/145; H04L 41/22; H04L 43/0882; G06N 5/02
See application file for complete search history.

(56) References Cited

U.S. PATENT DOCUMENTS

| | | | |
|---|---|---|---|
| 6,903,755 B1 | 6/2005 | Pugaczewski | |
| 7,249,060 B2 | 7/2007 | Ling | |
| 7,272,724 B2 * | 9/2007 | Tarbotton | G06F 21/564 714/45 |
| 7,313,796 B2 | 12/2007 | Hamilton | |
| 7,315,903 B1 * | 1/2008 | Bowden | H04L 43/0876 709/251 |
| 7,439,937 B2 | 10/2008 | Ben-Shachar | |
| 7,529,785 B1 | 5/2009 | Spertus et al. | |
| 7,546,462 B2 | 6/2009 | Upton | |
| 7,596,620 B1 | 9/2009 | Colton et al. | |
| 7,836,504 B2 * | 11/2010 | Ray | G06F 12/145 713/168 |
| 8,078,728 B1 | 12/2011 | Pollan et al. | |
| 8,108,931 B1 | 1/2012 | Witten et al. | |
| 8,166,132 B1 | 4/2012 | Mooneyham | |
| 8,225,317 B1 | 7/2012 | Chiueh et al. | |
| 8,255,529 B2 | 8/2012 | Ferris et al. | |
| 8,255,829 B1 | 8/2012 | McCormick et al. | |
| 8,271,653 B2 | 9/2012 | DeHaan | |
| 8,307,177 B2 | 11/2012 | Prahlad et al. | |
| 8,316,125 B2 | 11/2012 | DeHaan | |
| 8,321,936 B1 | 11/2012 | Green et al. | |
| 8,341,749 B2 * | 12/2012 | Rogel | H04W 12/128 726/25 |
| 8,352,012 B2 | 1/2013 | Besio | |
| 8,364,819 B2 | 1/2013 | Ferris et al. | |
| 8,370,628 B2 | 2/2013 | Mundy et al. | |
| 8,375,223 B2 | 2/2013 | DeHaan et al. | |
| 8,402,139 B2 | 3/2013 | Ferris et al. | |
| 8,443,363 B1 | 5/2013 | Brennan, III et al. | |
| 8,474,027 B2 | 6/2013 | Meijer et al. | |
| 8,478,823 B2 | 7/2013 | Fein et al. | |
| 8,504,443 B2 | 8/2013 | Ferris et al. | |
| 8,504,689 B2 | 8/2013 | Ferris et al. | |
| 8,606,667 B2 | 12/2013 | Ferris et al. | |
| 8,606,897 B2 | 12/2013 | Ferris et al. | |
| 8,612,577 B2 | 12/2013 | Ferris et al. | |
| 8,612,615 B2 | 12/2013 | Ferris et al. | |
| 8,631,099 B2 | 1/2014 | Morgan | |
| 8,713,147 B2 | 4/2014 | Ferris et al. | |
| 8,769,083 B2 | 7/2014 | Ferris et al. | |
| 8,782,192 B2 | 7/2014 | Morgan | |
| 8,825,791 B2 | 9/2014 | Morgan | |
| 8,832,219 B2 | 9/2014 | Morgan | |
| 8,832,459 B2 | 9/2014 | DeHaan | |
| 8,849,199 B2 | 9/2014 | Shrum, Jr. et al. | |
| 8,862,720 B2 | 10/2014 | DeHaan et al. | |
| 8,880,700 B2 | 11/2014 | Ferris et al. | |
| 8,881,284 B1 | 11/2014 | Gabriel | |
| 8,898,788 B1 | 11/2014 | Aziz et al. | |
| 8,904,005 B2 | 12/2014 | Ferris et al. | |
| 8,909,783 B2 | 12/2014 | Ferris et al. | |
| 8,909,784 B2 | 12/2014 | Ferris et al. | |
| 8,949,426 B2 | 2/2015 | Morgan | |
| 8,954,564 B2 | 2/2015 | Ferris et al. | |
| 8,959,221 B2 | 2/2015 | Morgan | |
| 8,977,750 B2 | 3/2015 | Ferris | |
| 8,984,104 B2 | 3/2015 | Morgan | |
| 9,037,723 B2 | 5/2015 | Morgan | |
| 9,053,472 B2 | 6/2015 | Ferris et al. | |
| 9,055,093 B2 | 6/2015 | Borders | |
| 9,104,407 B2 | 8/2015 | DeHaan et al. | |
| 9,177,145 B2 * | 11/2015 | Todorović | G06F 21/53 |
| 9,201,485 B2 | 12/2015 | DeHaan et al. | |
| 9,202,225 B2 | 12/2015 | Ferris et al. | |
| 9,235,705 B2 | 1/2016 | Freericks et al. | |
| 9,311,162 B2 | 4/2016 | DeHaan et al. | |
| 9,354,939 B2 | 5/2016 | Ferris et al. | |
| 9,389,980 B2 | 7/2016 | Ferris et al. | |
| 9,436,459 B2 | 9/2016 | Ferris et al. | |
| 9,442,771 B2 | 9/2016 | Morgan | |
| 9,450,783 B2 | 9/2016 | DeHaan | |
| 9,450,960 B1 * | 9/2016 | McCorkendale | G06F 21/568 |
| 9,485,117 B2 | 11/2016 | Ferris | |
| 10,924,506 B2 * | 2/2021 | Ferris | H04L 63/083 |
| 2001/0039497 A1 | 11/2001 | Hubbard | |
| 2002/0069276 A1 | 6/2002 | Hino et al. | |
| 2002/0143906 A1 | 10/2002 | Tormasov et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0042470 A1 | 3/2004 | Cooper et al. | |
| 2004/0154016 A1 | 8/2004 | Randall | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0075115 A1 | 4/2005 | Corneille et al. | |
| 2005/0108709 A1 | 5/2005 | Sciandra et al. | |
| 2005/0120242 A1 | 6/2005 | Mayer et al. | |
| 2005/0131898 A1 | 6/2005 | Atula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0020950 A1 | 1/2006 | Ladd et al. | |
| 2006/0037004 A1 | 2/2006 | Long et al. | |
| 2006/0075042 A1 | 4/2006 | Wang et al. | |
| 2006/0085530 A1 | 4/2006 | Garrett | |
| 2006/0085824 A1 | 4/2006 | Bruck et al. | |
| 2006/0130144 A1 | 6/2006 | Wernicke | |
| 2006/0161984 A1 * | 7/2006 | Phillips | G06F 21/564 713/188 |
| 2006/0177058 A1 | 8/2006 | Sarwono et al. | |
| 2006/0224436 A1 | 10/2006 | Matsumoto et al. | |
| 2006/0225065 A1 | 10/2006 | Chandhok et al. | |
| 2007/0011291 A1 | 1/2007 | Mi et al. | |
| 2007/0028001 A1 | 2/2007 | Phillips et al. | |
| 2007/0136814 A1 | 6/2007 | Lee et al. | |
| 2007/0143452 A1 | 6/2007 | Suenbuel et al. | |
| 2007/0174916 A1 * | 7/2007 | Ching | G06F 21/606 726/24 |

(56) References Cited

U.S. PATENT DOCUMENTS

| | | |
|---|---|---|
| 2007/0226715 A1 | 9/2007 | Kimura et al. |
| 2007/0250833 A1 | 10/2007 | Araujo et al. |
| 2007/0283282 A1 | 12/2007 | Bonfiglio et al. |
| 2007/0294676 A1 | 12/2007 | Mellor et al. |
| 2008/0049935 A1 | 2/2008 | Kocher et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0117909 A1 | 5/2008 | Johnson |
| 2008/0127348 A1 | 5/2008 | Largman et al. |
| 2008/0148341 A1 | 6/2008 | Ferguson et al. |
| 2008/0178290 A1 | 7/2008 | Besch et al. |
| 2008/0201645 A1 | 8/2008 | Francis et al. |
| 2008/0215796 A1 | 9/2008 | Lam et al. |
| 2008/0240150 A1 | 10/2008 | Dias et al. |
| 2008/0244579 A1 | 10/2008 | Muller |
| 2008/0320583 A1 | 12/2008 | Sharma et al. |
| 2008/0320594 A1 | 12/2008 | Jiang |
| 2009/0012885 A1 | 1/2009 | Cahn |
| 2009/0013374 A1 | 1/2009 | Tsai |
| 2009/0025006 A1 | 1/2009 | Waldspurger |
| 2009/0036111 A1 | 2/2009 | Danford et al. |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0100176 A1 | 4/2009 | Hicks et al. |
| 2009/0132695 A1 | 5/2009 | Surtani et al. |
| 2009/0158432 A1 | 6/2009 | Zheng et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0220551 A1 | 9/2009 | Sampson et al. |
| 2009/0222551 A1 | 9/2009 | Neely et al. |
| 2009/0222805 A1 | 9/2009 | Faus et al. |
| 2009/0228950 A1 | 9/2009 | Reed et al. |
| 2009/0228967 A1 | 9/2009 | Gbadegesin et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0271867 A1 | 10/2009 | Zhang |
| 2009/0276771 A1 | 11/2009 | Nickolov et al. |
| 2009/0282485 A1 | 11/2009 | Bennett |
| 2009/0287691 A1 | 11/2009 | Sundaresan et al. |
| 2009/0288084 A1 | 11/2009 | Astete et al. |
| 2009/0292654 A1 | 11/2009 | Katiyar et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2009/0319793 A1 | 12/2009 | Zic et al. |
| 2010/0005291 A1 | 1/2010 | Hulten et al. |
| 2010/0011368 A1 | 1/2010 | Arakawa et al. |
| 2010/0017512 A1 | 1/2010 | Ciano et al. |
| 2010/0017801 A1 | 1/2010 | Kundapur |
| 2010/0042720 A1 | 2/2010 | Stienhans et al. |
| 2010/0050172 A1 | 2/2010 | Ferris |
| 2010/0057658 A1 | 3/2010 | Fein et al. |
| 2010/0057831 A1 | 3/2010 | Williamson |
| 2010/0058347 A1 | 3/2010 | Smith et al. |
| 2010/0083303 A1 | 4/2010 | Redei et al. |
| 2010/0088205 A1 | 4/2010 | Robertson |
| 2010/0107160 A1 | 4/2010 | Srinivasan |
| 2010/0125612 A1 | 5/2010 | Amradkar et al. |
| 2010/0125664 A1 | 5/2010 | Hadar et al. |
| 2010/0125669 A1 | 5/2010 | Esfahany et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0154045 A1 | 6/2010 | Pairault et al. |
| 2010/0169477 A1 | 7/2010 | Stienhans et al. |
| 2010/0169948 A1 | 7/2010 | Budko et al. |
| 2010/0205541 A1 | 8/2010 | Rapaport et al. |
| 2010/0217864 A1 | 8/2010 | Ferris |
| 2010/0220622 A1 | 9/2010 | Wei |
| 2010/0235831 A1 | 9/2010 | Dittmer |
| 2010/0241980 A1 | 9/2010 | Sosnosky et al. |
| 2010/0257598 A1* | 10/2010 | Demopoulos ....... H04L 63/1441 726/13 |
| 2010/0287280 A1 | 11/2010 | Sivan |
| 2010/0299366 A1 | 11/2010 | Stienhans et al. |
| 2010/0306379 A1 | 12/2010 | Ferris |
| 2010/0306566 A1 | 12/2010 | Dehaan et al. |
| 2010/0306767 A1 | 12/2010 | Dehaan |
| 2011/0016214 A1 | 1/2011 | Jackson |
| 2011/0029887 A1 | 2/2011 | Pearson et al. |
| 2011/0041179 A1* | 2/2011 | Ståhlberg ............. G06F 21/566 726/23 |
| 2011/0055378 A1 | 3/2011 | Ferris et al. |
| 2011/0055385 A1 | 3/2011 | Tung et al. |
| 2011/0055707 A1 | 3/2011 | Kimmet |
| 2011/0055712 A1 | 3/2011 | Tung et al. |
| 2011/0055714 A1 | 3/2011 | Vemulapalli et al. |
| 2011/0106926 A1 | 5/2011 | McClain et al. |
| 2011/0131134 A1 | 6/2011 | Ferris et al. |
| 2011/0131306 A1 | 6/2011 | Ferris et al. |
| 2011/0131315 A1 | 6/2011 | Ferris et al. |
| 2011/0131335 A1 | 6/2011 | Spaltro et al. |
| 2011/0131499 A1 | 6/2011 | Ferris et al. |
| 2011/0145413 A1 | 6/2011 | Dawson et al. |
| 2011/0213687 A1 | 9/2011 | Ferris et al. |
| 2011/0213691 A1 | 9/2011 | Ferris et al. |
| 2011/0213719 A1 | 9/2011 | Ferris et al. |
| 2011/0214124 A1 | 9/2011 | Ferris et al. |
| 2012/0130873 A1 | 5/2012 | Morgan |
| 2012/0136989 A1 | 5/2012 | Ferris et al. |
| 2012/0137001 A1 | 5/2012 | Ferris et al. |
| 2012/0137002 A1 | 5/2012 | Ferris et al. |
| 2012/0221454 A1 | 8/2012 | Morgan |
| 2012/0304170 A1 | 11/2012 | Morgan |
| 2012/0311571 A1 | 12/2012 | Morgan |
| 2013/0167128 A1 | 6/2013 | Iyer et al. |

FOREIGN PATENT DOCUMENTS

| | | | | |
|---|---|---|---|---|
| CN | 102177503 A | | 9/2011 | |
| CN | 102177503 B | * | 7/2014 | ......... G06F 9/45558 |
| EP | 2154626 | | 2/2010 | |
| JP | 2004527857 A | * | 9/2004 | |
| WO | 2009049570 | | 4/2009 | |

OTHER PUBLICATIONS

"rBuilder and the rPath Appliance Platform", 2007 rPath, Ic., www.rpath.com, 3 pages.
White Paper—"rPath Versus Other Software Appliance Appraoches", Mar. 2008, rPath, Inc., www.rpath.com, 9 pages.
White Paper—"Best Practices for Building Virtual Appliances", 2008 rPath, Inc., www.rpath.com, 6 pages.
How Computers Work by Ron White 7th edition.

(56) References Cited

OTHER PUBLICATIONS

PC Magazine Encyclopedia of Computer Terms, "disk image", https://www.pcmag.com/encyclopedia/term/disk-image, 1 page.
Olzak, Thomas, ScienceDirect, "Virtual Machine Image", https://www.sciencedirect.com/topics/computer-science/virtual-machine-image, 12 pages, 2010.

* cited by examiner

```
                    REPORT USER 310

CLOUD 304 :        CURRENT FEE      $3,000.00

COMPUTING PROCESSES 316
         - VIRTUAL MACHINE 0001 -  30 HOURS
              - RHEL V.3
              - EMAIL SERVER V1
         - VIRTUAL MACHINE 0002 -  25 HOURS
              - RHEL V.3
              - WEB SERVER V1

CLOUD 306 :        CURRENT FEE      $15,000.00

COMPUTING PROCESSES 318
         - VIRTUAL MACHINE 0001 -  50 HOURS
              - RHEL V.3
              - EMAIL SERVER V1
         - SOFTWARE APPLIANCE -  50 HOURS
              - RHEL V.3
              - APPLICATION SERVER
```

MONITORING CLOUD COMPUTING ENVIRONMENTS

RELATED APPLICATIONS

This application is a continuation of U.S. patent application Ser. No. 15/386,103 filed on Dec. 21, 2016, entitled "Monitoring Cloud Computing Environments," which is a continuation of U.S. patent application Ser. No. 12/627,764 filed on Nov. 30, 2009, entitled "Monitoring Cloud Computing Environments", and issued as U.S. Pat. No. 9,529,689 on Dec. 27, 2016. The above-referenced applications are incorporated by reference herein.

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

Typically, when a user utilizes a cloud, the user must track the processes instantiated in the cloud. For example, the user must track the cloud processes to ensure that the correct cloud processes have been instantiated, that the cloud processes are functioning properly, etc. Due to the user's requirements and usage of the cloud, the user may have many processes instantiated in a cloud and may be utilizing multiple independent clouds to support the cloud processes. As such, the user may have difficulty tracking the virtual machines over time.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for independently monitoring cloud computing environments. More particularly, embodiments relate to platforms and techniques in which a monitoring system can monitor the cloud computing environments for users.

According to embodiments, a monitoring system can be configured to provide monitoring services to users of cloud computing environment. In particular, the monitoring system can be configured to receive access information from users subscribing to the monitoring services. Once received, the monitoring system can be configured to access clouds utilizing the access information and monitor the computing processes instantiated in the clouds and associated with the user. The monitoring system can be configured to monitor the computing processes and collect information such as usage of cloud resources, number and type of computing processes instantiated, software applications utilized by the computing processes, and the like.

According to embodiments, once the information is collected, the monitoring system can be configured to store the collected information associated with the user's access information. Likewise, the monitoring system can be configured to provide reports to the user describing the information collected about the processes instantiated in the cloud.

By providing monitoring services, the monitoring system can enable the user to track computing processes instantiated in clouds without devoting time and manpower to tracking the computing processes. As such, the user can ensure that computing processes in the cloud are instantiated and running properly.

Figure 1:
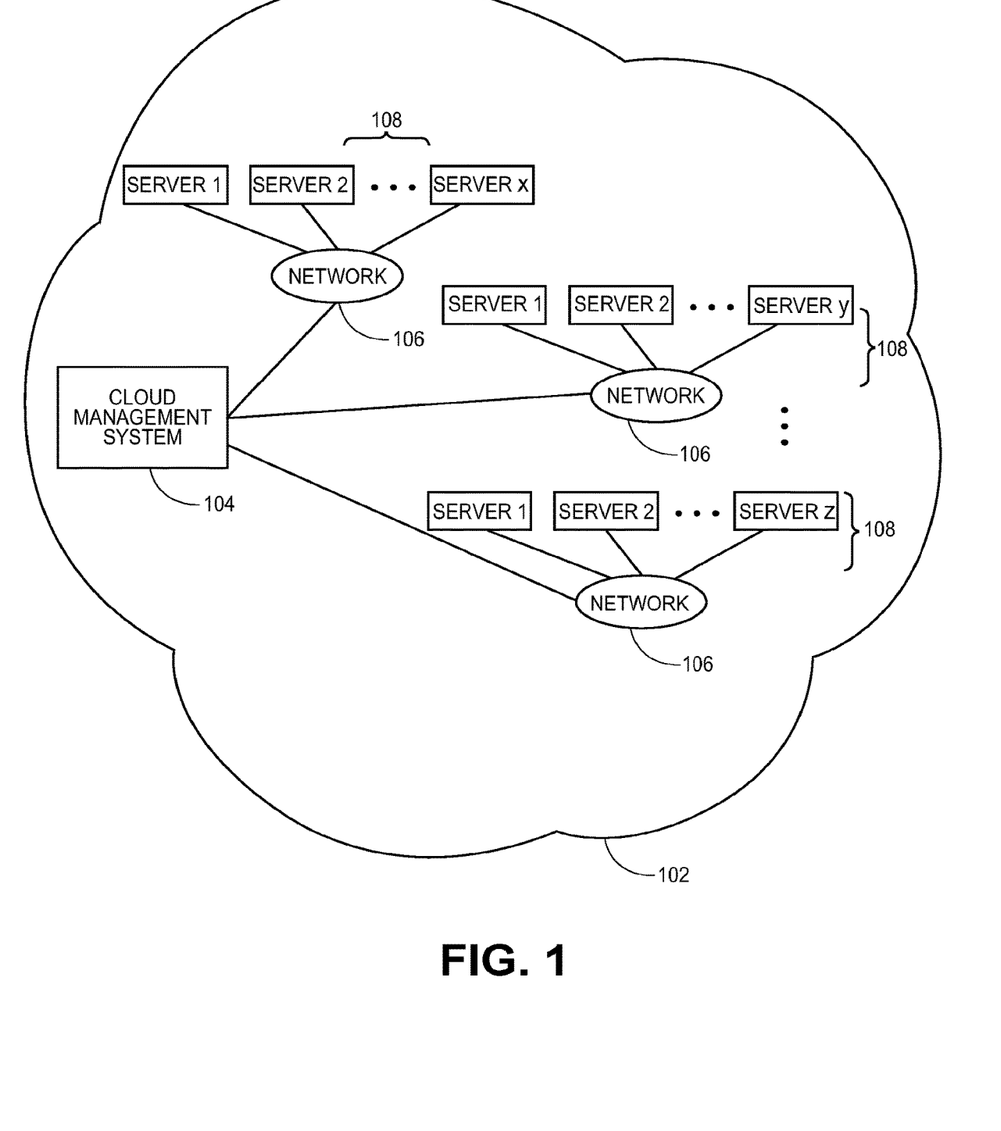
FIG. 1 illustrates an overall cloud system architecture in which various embodiments of the present teachings can be practiced.

FIG. 1 illustrates an overall cloud computing environment, in which systems and methods for the management of subscriptions of cloud-based virtual machines can operate, according to embodiments of the present teachings. Embodiments described herein can be implemented in or supported by a cloud network architecture. As used herein, a "cloud"

can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines can be managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, because the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select a group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in a set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
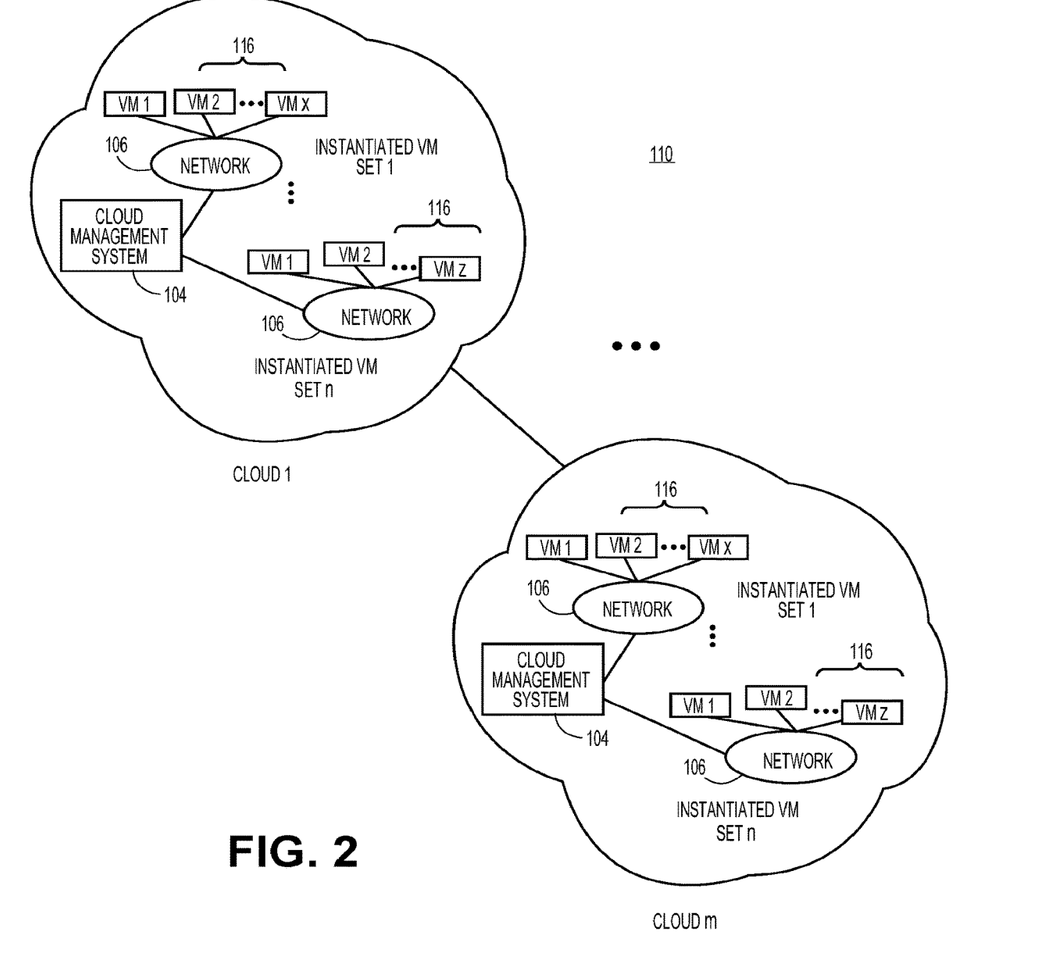
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other number of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
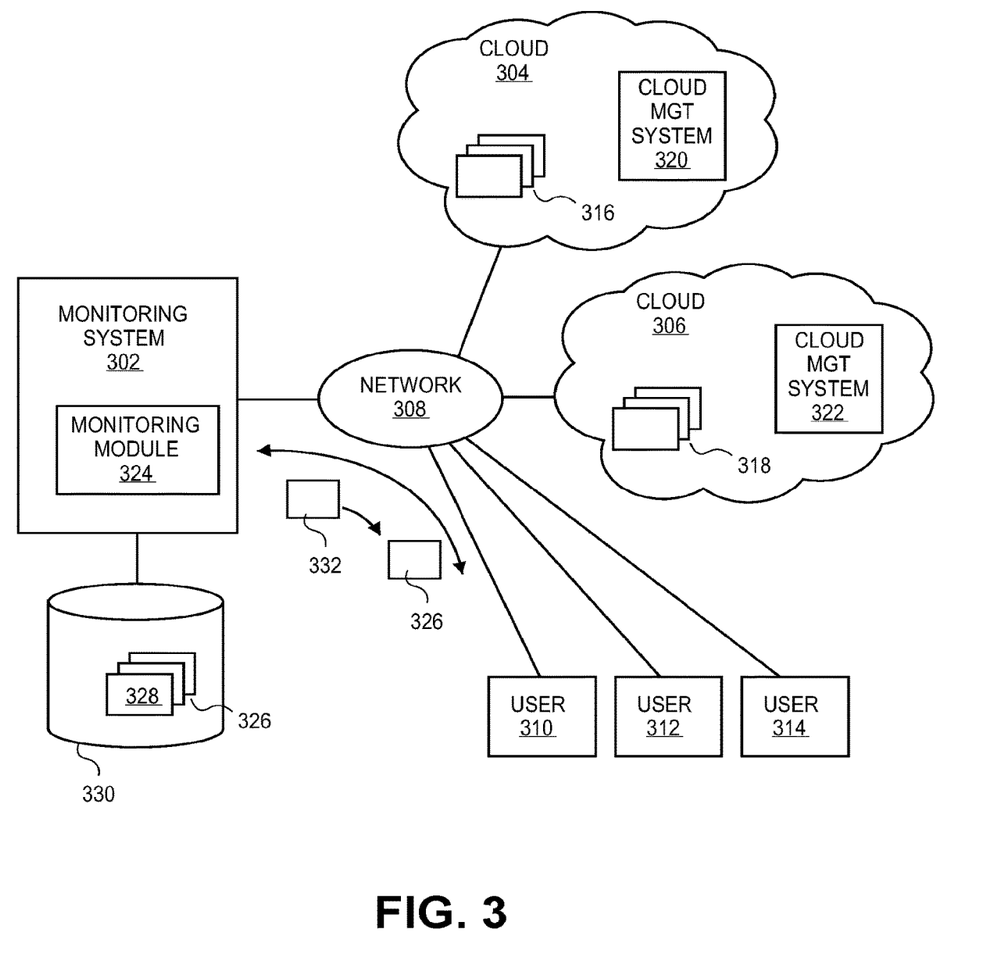
FIG. 3 illustrates an overall system in which a monitoring system can provide monitoring services to users of multiple clouds, according to various embodiments.

FIG. 3 illustrates aspects in which a monitoring system 302 can communicate with clouds 304 and 306, via one or more networks 308, according to various embodiments. While FIG. 3 illustrates various components of the monitoring system 302 and the clouds 304 and 306, one skilled in the art will realize that components can be added or removed.

In embodiments, one or more users 310, 312, and 314 can utilize one or more of the clouds 304 and 306 to support computing processes of the user 310, 312, and 314. For example, the user 310 can utilize the cloud 304 to support computing processes 316 and can utilize cloud 306 to supporting computing processes 318. The computing processes 316 and 318 can be any type of computing processes, such as virtual machines, software appliances, software programs, etc. The users 310, 312, and 314 can be any type of entity, such as individual users, corporations, companies, universities, and the like, that utilizes the clouds 304 and 306 to support computing processes. While FIG. 3 will be described with reference to user 310, one skilled in the art will realize that the processes and methods can be applied to any of the users 310, 312, and 314 or any other users. Additionally, while FIG. 3 illustrates users 310, 312, and 314, one skilled in the art will realize that methods and processes can apply to any number of users.

In embodiments, the clouds 304 and 306 can be any type of cloud computing environments, such as the cloud computing environments described above in FIGS. 1 and 2. As described above, the clouds 304 and 306 can include any number of computing systems to support the computing processes in the cloud. The computing systems can be any type of computing systems capable of supporting computing processes, such as servers, laptops, desktops, and the like. The computing systems can include a number of hardware resources, which are used to support the computing processes (e.g. virtual machines, software appliances, processes and the like) in the clouds 304 and 306, such as processors, memory, network hardware and bandwidth, storage devices, etc. Additionally, the clouds 304 and 306 can include a cloud management system 320 and 322, respectively. The cloud management systems 320 and 322 can be supported by the computing resources of the clouds 304 and 306, respectively.

In embodiments, the cloud 304 and/or 306 can be operated and controlled by any number of entities. For example, the cloud 304 and/or the cloud 306 can be owned and/or operated by a cloud vendor, such as Amazon™, Inc., in order to provide the services of the cloud 304 and/or the cloud 306 to subscribers and customers. Likewise, for example, the cloud 304 and/or the cloud 306 can be owned and/or operated by one or more of the users 310, 312 and 314, and the resources of the cloud 304 and/or the cloud 306 can be used by the entity, internally, to support various computing processes. As such, in either case, the cloud 304 and the cloud 306 can be configured to include hardware, described above, and software resources to support computing processes. For example, if the cloud 304 and/or the cloud 306 is operated by a cloud vendor, the software resources can include operating systems, such as a distribution of Linux provided by Red Hat™ Corporation, and various application programs requested or typically desired by subscribers, such as middleware applications, web hosting applications, electronic mail (email) applications, and the like. Likewise, for example, if the cloud 304 and/or the cloud 306 is operated by an entity for internal use, the software resources can include software resources required to support the specific internal uses. For instance, the cloud can be utilized by a corporation to perform simulations on a product and the software resources can include operating systems and application programs to run the simulations.

In embodiments, the one or more networks 308 can be or include the Internet, or other public or private networks. The one or more or more networks 308 can be or include wired, wireless, optical, and other network connections. One skilled in the art will realize that the one or more networks 308 can be any type of network, utilizing any type of communication protocol, to connect the computing systems.

In embodiments, due to the dynamics of the computing processes 316 and 318, the user 310 can desire to actively monitor the computing processes 316 and 318. For instance, the user 310 can desire to monitor the computing processes 316 and 318 to ensure that the appropriate computing processes are running and functioning properly. Likewise, the user 310 can desire to monitor the computing processes 316 and 318 to determine the usage of the resources of the clouds 304 and 306 for billing and other purposes. Additionally, the computing processes 316 and 318 can spawn new computing processes in the clouds 304 and 306, which the user 310 can desire to monitor.

In embodiments, the monitoring system 302 can be configured to monitor the clouds 304 and 306 for the one or more users 310, 312, and 314. In particular, the monitoring system 302 can be configured to monitor the computing process associated with the users 310, 312, and 314 and supported by the clouds 304 and 306. The monitoring system 302 can be configured to subscribe the users 310, 312, and 314 to the monitoring services provided by the monitoring system 302. Once subscribed, the monitoring system 302 can be configured to receive access information from the users 310, 312, and 314. The monitoring system 302 can be configured to utilize the access information to access and communicate with the clouds 304 and 306 in order to monitor the computing processes supported by the clouds 304 and 306 and to collect information about the computing processes. Additionally, the monitoring system 302 can be configured to report any information collected during the monitoring to the users 310, 312, and 314.

In embodiments, the monitoring system 302 can be operated by an entity that provides the monitoring services to the users 310, 312, and 314. The monitoring services can be provided to the users 310, 312, and 314 at a fee. The monitoring system 302 can be supported by one or more computing systems, such as servers, laptops, desktops, and the like. The monitoring system 302 can include conventional components of a computing system, such as such as processors, memory, network interfaces, storage devices, etc.

In embodiments, to provide the monitoring services, the monitoring system 302 can be configured to include a monitoring module 324. The monitoring module 324 can be configured to cooperate and communicate with the users 310, 312, and 314 to subscribe the user 310, 312, and 314 to the monitoring services and to report any gathered information to the users 310, 312, and 314. Likewise, the monitoring module 324 can be configured to cooperate and communicate with the clouds 304 and 306 to monitor computing processes supported by the cloud 304 and 306. The monitoring module 324 can be implemented as a software program that is configured to execute on the monitoring system 302. Likewise, the monitoring module 324 can be implemented as a portion of other software programs configured to execute on the monitoring system 302. In either case, the monitoring module 324 can be configured to include the necessary logic, commands, instructions, and protocols to perform the processes described below. In any implementation, the monitoring module 324 can be written in any type of conventional programming language such as C, C++, JAVA, Perl, and the like. Additionally, the monitoring module 324 can be stored in computer readable storage devices or media (CD, DVD, hard drive, portable storage memory, etc.) whether local to the monitoring system 302 or remotely located.

In embodiments, to subscribe the user 310 to the monitoring services, the monitoring module 324 can be configured to provide an interface 326 to receive a request for the monitoring services. The interface 326 can be configured to provide the details and terms of the monitoring services (monitoring services offered, fee, etc.). Likewise, if the user 310 accepts the offer of monitoring services, the interface 326 can be configured to receive, from the user 310, access information to the clouds 304 and 306, which the user 310 utilizes for the computing processes 316 and 318. To achieve this, the monitoring module 324 can be configured to include the necessary logic, commands, instructions, and protocols to generate and provide the interface 326, such as command line or graphical user interfaces (GUIs), to receive the request for the monitoring services. The monitoring module 324 can be configured to provide the interface 326 to the user 310 via the network 308 utilizing any type of network protocol, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol. Likewise, the monitoring module 324 can be configured to allow software programs executing on the computing systems of the user 310 to provide the request. The monitoring module 324 can be configured to include an application programming interface (API) to provide the interface 326 that allows software programs of the user 310 to call the monitoring module 324 and provide the request.

In embodiments, the request can include access information required to access the clouds 304 and 306 in order to monitor the computing process 316 and 318. For example, if the cloud 304 is operated by a cloud vendor, the access information can include identification of the cloud (name of the vendor, type of cloud, the user 310 account number, network address of the cloud, etc.) and the log-in and password to gain access to the account of the user 310. Likewise, if the cloud 306 is operated by the user 310, the access information can include the network addresses (Internet Protocol (IP) address ranges, domain ranges of the cloud, etc.) and log-in and password, if necessary.

In embodiments, once the user 310 has subscribed, the monitoring module 324 can be configured to generate and maintain a set 326 of user records 328. Each user record 328 in the set 326 can be configured to store an identification of the user 310, the access information for the clouds associated with the user 310, and any information collected during the monitoring of the computing processes 316 and 318. The monitoring module 324 can maintain the set 326 of user records 328 in a repository 330, such as a database. The repository 330 can be stored in computer readable storage devices or media (CD, DVD, hard drive, portable storage memory, etc.) whether local to the monitoring system 302 or remotely located.

In embodiments, once the user 310 is subscribed, the monitoring module 324 can be configured to communicate with the clouds 304 and 306 to monitor the computing processes 316 and 318. For example, the monitoring module 324 can be configured to retrieve the access information from the user record 328 associated with the user 310 in order to access the computing processes 316 and 318 associated with the user 310. To retrieve the user record 328, the monitoring module 324 can be configured to include the necessary logic, commands, instructions, and protocols to search the set 326 of user records 328 and to retrieve the user record 328 and the access information for the user 310. For instance, the monitoring module 324 can be configured to include the necessary queries and commands to communicate with and retrieve information from the repository 330.

In embodiments, once the access information is retrieved, the monitoring module 324 can be configured to access the clouds 304 and 306 and to monitor the computing processes 316 and 318 in order to collect information about the computing processes. The monitoring module 324 can be configured to monitor the computing processes 316 and 318 and collect information such as usage of cloud resources by the computing processes 316 and 318, details of the computing processes 316 and 318, and the like. For example, for usage of the cloud resources, the monitoring module 324 can be configured to collect information, such as type and number of hardware resources of the clouds 304 and 306 utilized by the computing processes 316 and 318 (amount of processing cycles utilized, amount of network bandwidth utilized, amount of storage space utilized, amount of memory utilized, etc.), the type and number of software resources of the clouds 304 and 306 utilized by the computing processes 316 and 318, the duration the hardware and software resources are utilized, the current fees for using the clouds 304 and 308, and the like. Additionally, for example, the monitoring module 324 can be configured to collect information about details of the computing processes 316 and 318, themselves, such as number and type of the computing processes 316 and 318 instantiated, start time and duration of the computing processes 316 and 318, software programs utilized by the computing processes 316 and 318, and the like.

In embodiments, in order to monitor and collect information about the computing processes 316 and 318, the monitoring module 324 can be configured to communicate with the cloud management systems 320 and 322 of the clouds 304 and 306, respectively. For example, the monitoring module 324 can be configured to communicate with the cloud management systems 320 and 322 in order to collect information about the usage of the clouds 304 and 306. Likewise, the monitoring module 324 can be configured to communicate with the computing processes 316 and 318 to collect information about the details of the computing processes 316 and 318. For example, the monitoring module 324 can be configured to communicate with virtual machine monitors supporting virtual machines, with the virtual machines directly, with software appliances, with the software programs, and the like.

In embodiments, to communicate with the clouds 304 and 306, the monitoring module 324 can be configured to establish a connection with the cloud 304 and 306 via the network 308. In particular, the monitoring module 324 can be configured to establish a connection with the cloud management systems 320 and 322 and/or a connection to the computing processes 316 and 318. To achieve this, m the monitoring module 324 can be configured to include the necessary logic, instructions, commands, and protocols to communicate with the cloud management systems 320 and 322 and/or a connection to the computing processes 316 and 318 via network 308. For example, the monitoring module 324 can be configured to establish a connection using network protocols, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol.

In embodiments, the monitoring module 324 can be configured to monitor the computing processes 316 and 318 periodically and/or upon the occurrence of any events. For example, the monitoring module 324 can be configured to monitor the computing processes 316 and 318 upon the subscription of the user 310 and periodically (every hour, once a day, etc.) while the user 310 is subscribed.

In embodiments, once information about the computing processes 316 and 318 is collected, the monitoring module 324 can be configured to store the collected information in the user record 328 associated with the user 310. As such, the monitoring module 324 can be configured to classify the collected information and store the information in the user record 328. To achieve this, the monitoring module 324 can be configured to include the necessary logic, commands, instructions, and protocols to sort and classify the collected information and store the sorted and classified information in the user record 328.

In embodiments, when the information is collected, the monitoring module 324 can be configured to generate reports 332 to provide the collected information to the user 310. The monitoring module 324 can be configured to generate the report in any format to display the collected information to the user 310. To achieve this, the monitoring module 324 can include the necessary logic, commands, instructions, and protocols to retrieve the collected information from the user record 328 and organize the collected information into the report 332.

Figure 4:
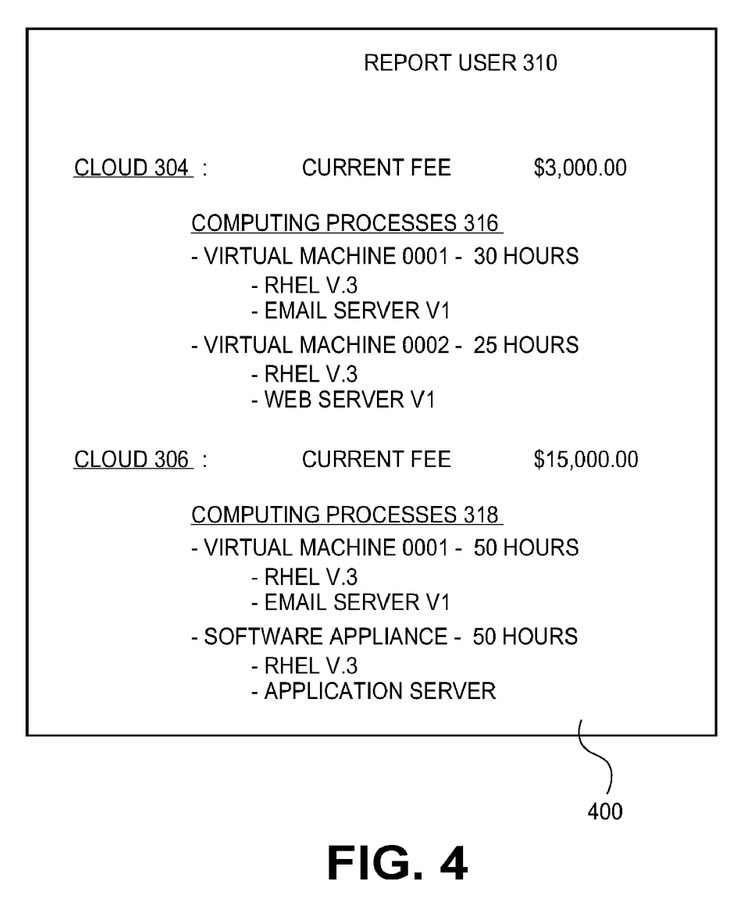
FIG. 4 illustrates an exemplary report generated by the monitoring system, according to various embodiments.

In embodiments, the monitoring module 324 can be configured to generate and provide the reports 332 to the user upon the occurrence of any number of events. For example, the monitoring module 324 can be configured to provide the reports upon request of the user 310 and/or periodically. The monitoring module 324 can be configured to receive the request for the report via the interface 326. Likewise, the monitoring module 324 can be configured to provide the reports 332 via the interface 326. Additionally, the monitoring module 324 can provide the reports to the user 310 via the network 308 utilizing any type of network protocol, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol FIG. 4 illustrates an exemplary report 400, according to various embodiments. As illustrated in FIG. 4, the report 400 can include the information collected about the computing processes 316 and 318 supported by the clouds 304 and 306. The report 400 can include details about the usage of resources of the clouds 304 and 306 and the details of the computing processes 316 and 318.

Figure 5:
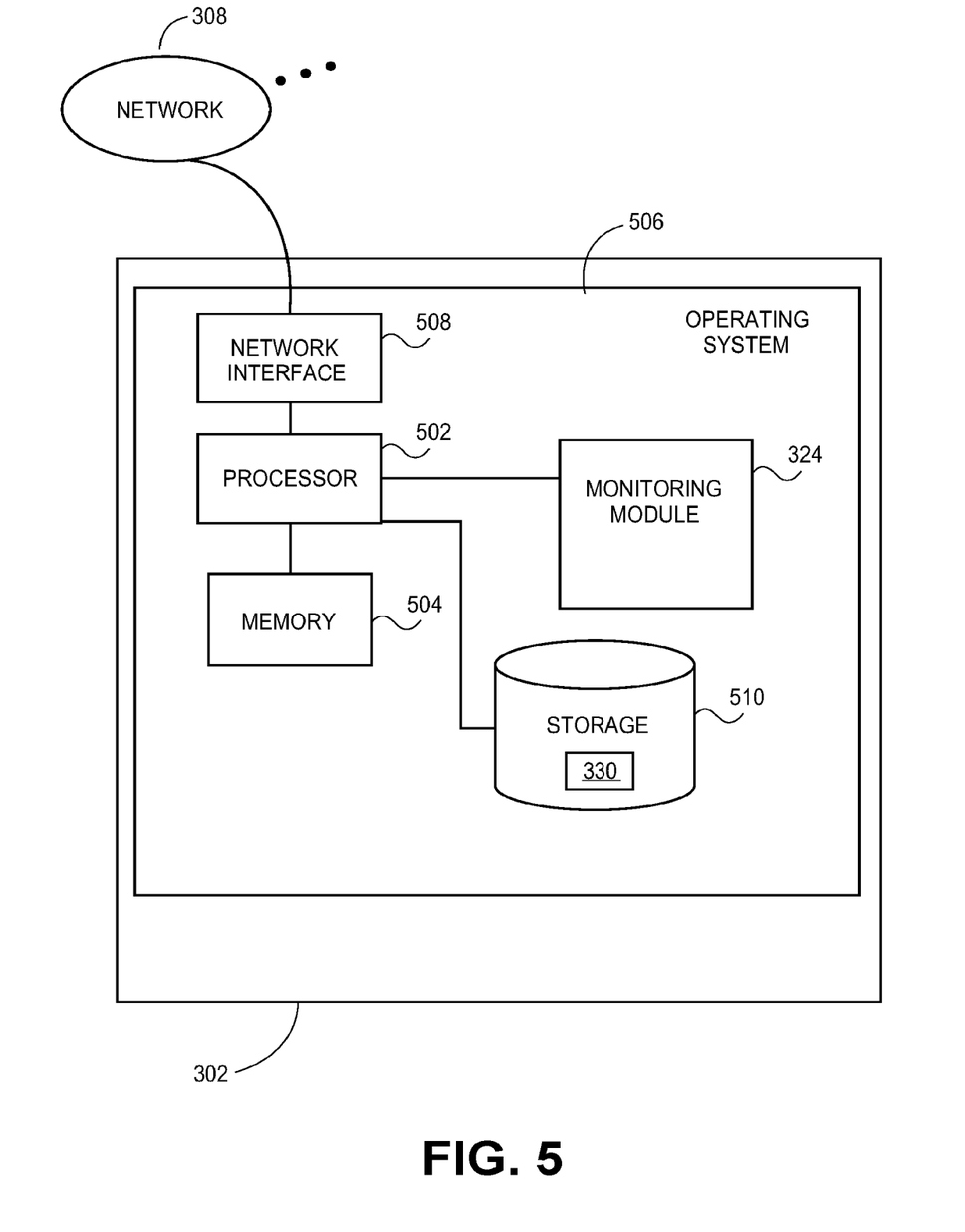
FIG. 5 illustrates an exemplary hardware configuration for a monitoring system, according to various embodiments.

FIG. 5 illustrates an exemplary diagram of hardware and other resources that can be incorporated in the monitoring system 302, which can implement monitoring module 324, and configured to communicate with the clouds 304 and 306 via one or more networks 308, according to embodiments. In embodiments as shown, the monitoring system 302 can comprise a processor 502 communicating with memory 504, such as electronic random access memory, operating under control of or in conjunction with operating system 506. Operating system 506 can be, for example, a distribution of the Linux™ operating system, such as SELinux, the Unix™ operating system, or other open-source or proprietary operating system or platform. Processor 502 also communicates with one or more computer readable storage medium 510, such as hard drives, optical storage, and the like, which can store the repository 330. Processor 502 further communicates with network interface 508, such as an Ethernet or wireless data connection, which in turn communicates with one or more networks 308, such as the Internet or other public or private networks.

Processor 502 also communicates with the monitoring module 324 to execute control logic and allow for monitoring computing processes as described above and below. Other configurations of the monitoring system 302, associated network connections, and other hardware and software resources are possible.

While FIG. 5 illustrates the monitoring system 302 as a standalone system including a combination of hardware and software, the monitoring system 302 can include multiple systems operating in cooperation. The monitoring module 324 can be implemented as a software application or program capable of being executed by the monitoring system 302, as illustrated, or other conventional computer platforms. Likewise, the monitoring module 324 can also be implemented as a software module or program module capable of being incorporated in other software applications and programs. In either case, the monitoring module 324 can be implemented in any type of conventional proprietary or open-source computer language. When implemented as a software application or program code, the monitoring module 324 can be stored in a computer readable storage medium, such as storage 510 accessible by the monitoring system 302. Likewise, during execution, a copy of the monitoring module 324 can be stored in the memory 504.

Figure 6:
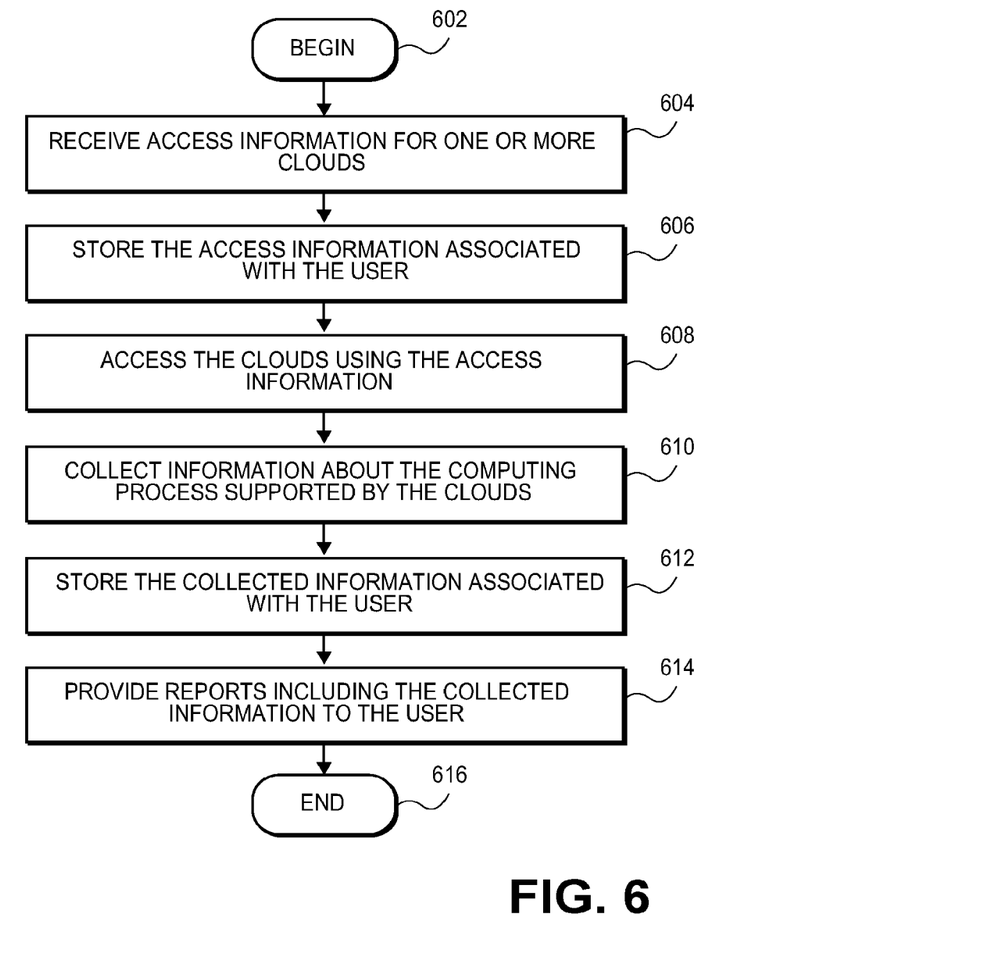
FIG. 6 illustrates a flowchart of an exemplary process for monitoring cloud computing environments, according to various embodiments.

FIG. 6 illustrates a flow diagram of an exemplary process for monitoring clouds, according to embodiments. In 602, processing can begin. In 604, the monitoring system 302 can receive access information for the clouds 304 and 306 to monitor for the user 310. For example, the monitoring system 302 can provide the interface 326 to receive the access information. The access information can include information required to access the clouds 304 and 306 in order to monitor the computing process 316 and 318. For example, if the cloud 304 is a operated by a cloud vendor, the access information can include identification of the cloud (name of the vendor, type of cloud, the user 310 account number, network address of the cloud, etc.) and the log-in and password to gain access to the account of the user 310. Likewise, if the cloud 306 is operated by the user 310, the access information can include the network addresses (Internet Protocol (IP) address ranges, domain ranges of the cloud, etc.) and log-in and password, if necessary.

In 606, the monitoring system 302 can store the access information associated with the user 310. For example, the monitoring system 302 can store the access information in a user record 328 associated with the user 310.

In 608, the monitoring system 302 can access the clouds 304 and 306 utilizing the access information. For example, the monitoring system 302 can establish a connection with the cloud 304 and 306 via the network 308. In particular, the monitoring system 302 can establish a connection with the cloud management systems 320 and 322 and/or a connection to the computing processes 316 and 318.

In 610, the monitoring system can collect information about the computing processes 316 and 318 supported by the clouds 304 and 306. For example, the monitoring system 302 can collect information such as usage of cloud resources by the computing processes 316 and 318, details of the computing processes 316 and 318, and the like. For example, for usage of the cloud resources, the monitoring system 302 can collect information, such as type and number of hardware resources of the clouds 304 and 306 utilized by the computing processes 316 and 318 (amount of processing cycles utilized, amount of network bandwidth utilized, amount of storage space utilized, amount of memory utilized, etc.), the type and number of software resources of the clouds 304 and 306 utilized by the computing processes 316 and 318, the duration the hardware and software resources are utilized, the current fees for using the clouds 304 and 308, and the like. Additionally, for example, the monitoring system 302 can collect information about details of the computing processes 316 and 318, themselves, such as number and type of the computing processes 316 and 318 instantiated, start time and duration of the computing processes 316 and 318, software programs utilized by the computing processes 316 and 318, and the like.

In 612, the monitoring system 302 can store the collected information associated with the user 310. For example, the monitoring system 302 can store the collected information in the user record 328 associated with the user 310.

In 614, the monitoring system 302 can provide reports to the user 310 including the collected information. For example, the monitoring system 302 can generate reports 332 and provide the reports 332 to the user 310. The monitoring system 302 can provide the reports via the network 308.

In 616, the process can end, but the process can return to any point and repeat.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the aspects have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
receiving, by a processor, a request to subscribe to a monitoring service with respect to computing resources in a cloud computing system comprising a plurality of virtual machines;
monitoring resource usage by a plurality of applications running on the plurality of virtual machines, wherein the plurality of applications comprises a first application and a second application associated with the first application, wherein the resource usage differs between virtual machines of the plurality of virtual machines;
receiving, in view of the monitoring, resource usage data reflecting types and duration of usage of the computing resources by the plurality of applications running on the plurality of virtual machines;
identifying, based on the resource usage data, a virus-infected application among the plurality of applications running on a virtual machine of the plurality of virtual machines, wherein the virus-infected application is one of:
the first application or the second application;
terminating, by the processor, the virus-infected application; and
generating, in view of a set of user rights associated with each virtual machine of the plurality of virtual machines, a report comprising resource usage information for the virtual machine, wherein the report indicates a difference in resource usage due to termination of the virus-infected application.

2. The method of claim 1, further comprising:
generating a resource aggregation table identifying a plurality of servers employed for providing the computing resources.

3. The method of claim 2, further comprising:
instantiating the computing resources in view of the resource aggregation table.

4. The method of claim 1, further comprising:
instantiating, within a cloud of the cloud computing system, a computing resource associated with the plurality of virtual machines.

5. The method of claim 1, further comprising:
delivering a software upgrade to the plurality of virtual machines.

6. The method of claim 1, wherein monitoring the plurality of virtual machines comprises establishing a connection with the cloud computing system in view of access information specified by the request.

7. The method of claim 1, wherein the cloud computing system include at least one of: a subscription-based cloud or a user-controlled cloud.

8. The method of claim 1, wherein the computing resources are associated with at least one of: a first sub-cloud of the cloud computing system or a second sub-cloud of the cloud computing system.

9. A system, comprising:
a hardware memory;
a processor, operatively coupled to the memory, to:
receive a request to subscribe to a monitoring service with respect to computing resources in a cloud computing system comprising a plurality of virtual machines;
monitor resource usage by a plurality of applications running on the plurality of virtual machines, wherein the plurality of applications comprises a first application and a second application associated with the first application, wherein the resource usage differs between virtual machines of the plurality of virtual machines;
receive, in view of the monitoring, resource usage data reflecting types and duration of usage of the computing resources by the plurality of applications running on the plurality of virtual machines;
identify, based on the resource usage data, a virus-infected application among the plurality of applications running on a virtual machine of the plurality of virtual machines, wherein the virus-infected application is one of: the first application or the second application;
terminate, by the processor, the virus-infected application; and
generate, in view of a set of user rights associated with each virtual machine of the plurality of virtual machines, a report comprising resource usage information for the virtual machine, wherein the report indicates a difference in resource usage due to termination of the virus-infected application.

10. The system of claim 9, wherein the processor is further to:
generate a resource aggregation table identifying a plurality of servers employed to provide the computing resources.

11. The system of claim 10, wherein the processor is further to:
instantiate the computing resources in view of the resource aggregation table.

12. The system of claim 9, wherein the processor is further to:
instantiate, within a cloud of the cloud computing system, a computing resource associated with the plurality of virtual machines.

13. The system of claim 9, wherein the processor is further to:
deliver a software upgrade to the plurality of virtual machines.

14. The system of claim 9, wherein monitoring the plurality of virtual machines comprises establishing a connection with the cloud computing system in view of access information specified by the request.

15. The system of claim 9, wherein the cloud computing system include at least one of: a subscription-based cloud or a user-controlled cloud.

16. A non-transitory computer-readable storage medium storing executable instructions that, when executed by a processor, cause the processor to:
receive a request to subscribe to a monitoring service with respect to computing resources in a cloud computing system comprising a plurality of virtual machines;
monitor resource usage by a plurality of applications running on the plurality of virtual machines, wherein the plurality of applications comprises a first application and a second application associated with the first application, wherein the resource usage differs between virtual machines of the plurality of virtual machines;
receive, in view of the monitoring, resource usage data reflecting types and duration of usage of the computing resources by the plurality of applications running on the plurality of virtual machines;
identify, based on the resource usage data, a virus-infected application among the plurality of applications running on a virtual machine of the plurality of virtual machines, wherein the virus-infected application is one of:
the first application or the second application;
terminate, by the processor, the virus-infected application; and
generate, in view of a set of user rights associated with each virtual machine of the plurality of virtual machines, a report comprising resource usage information for the virtual machine, wherein the report indicates a difference in resource usage due to termination of the virus-infected application.

17. The non-transitory computer-readable storage medium of claim 16, wherein the processor is further to:
generate a resource aggregation table identifying a plurality of servers employed to provide the computing resources.

18. The non-transitory computer-readable storage medium of claim 17, wherein the processor is further to:
instantiate the computing resources in view of the resource aggregation table.

19. The non-transitory computer-readable storage medium of claim 16, wherein the processor is further to:
instantiate, within a cloud of the cloud computing system, a computing resource associated with the plurality of virtual machines.

20. The non-transitory computer-readable storage medium of claim 17, wherein the cloud computing system include at least one of: a subscription-based cloud or a user-controlled cloud.

* * * * *